United States Patent
Ceppi et al.

(10) Patent No.: US 12,236,401 B2
(45) Date of Patent: Feb. 25, 2025

(54) TRADING PARTNER RELATIONSHIP GRAPH FOR INFORMATION EXCHANGE PLATFORM

(71) Applicant: OPEN TEXT GXS ULC, Halifax (CA)

(72) Inventors: Ricardo Ceppi, Vienna, VA (US); John Theodore Radko, Germantown, MD (US); Miguel Garcia, Atlanta, GA (US)

(73) Assignee: OPEN TEXT GXS ULC, Halifax (CA)

(*) Notice: Subject to any disclaimer, the term of this patent is extended or adjusted under 35 U.S.C. 154(b) by 0 days.

(21) Appl. No.: 18/543,503

(22) Filed: Dec. 18, 2023

(65) Prior Publication Data
US 2024/0119418 A1    Apr. 11, 2024

Related U.S. Application Data

(63) Continuation of application No. 18/165,149, filed on Feb. 6, 2023, now Pat. No. 11,853,970, which is a continuation of application No. 17/175,436, filed on Feb. 12, 2021, now Pat. No. 11,574,286, which is a continuation of application No. 16/424,060, filed on May 28, 2019, now Pat. No. 10,922,655, which is a
(Continued)

(51) Int. Cl.
| | |
|---|---|
| *G06Q 10/10* | (2023.01) |
| *G06Q 10/101* | (2023.01) |
| *G06T 11/20* | (2006.01) |
| *H04L 67/1097* | (2022.01) |

(52) U.S. Cl.
CPC .......... *G06Q 10/103* (2013.01); *G06T 11/206* (2013.01); *H04L 67/1097* (2013.01); *G06Q 10/10* (2013.01); *G06Q 10/101* (2013.01)

(58) Field of Classification Search
CPC .... G06Q 10/103; G06Q 10/101; G06Q 10/10; H04L 67/1097; G06T 11/206
See application file for complete search history.

(56) References Cited

U.S. PATENT DOCUMENTS

| | | | | |
|---|---|---|---|---|
| 6,125,391 A | * | 9/2000 | Meltzer | G06Q 10/06 705/26.1 |
| 6,226,675 B1 | * | 5/2001 | Meltzer | G06Q 10/06 705/26.8 |

(Continued)

*Primary Examiner* — David R Lazaro
(74) *Attorney, Agent, or Firm* — Sprinkle IP Law Group

(57) ABSTRACT

An information exchange platform referred to as a Trading Grid (TG) may perform relationship-based data processing utilizing a trading partner (TP) graph that describes relationships amongst operating units (OUs) on the TG. When the TG receives a request from an OU to exchange data with a TP, the TG accesses the TP graph and determines a relationship between the OU and their TP as reflected in the TP graph. The TP graph is maintained and controlled by the system independently of the OU and the TP. The TG may route the data based on instructions associated with the relationship that is reflected in the TP graph. The instructions associated with the relationship may specify network based services provided by the TG. An orchestration component may operate to orchestrate the performance of the network based services. The TG then communicates the processed and/or produced data to the TP.

20 Claims, 10 Drawing Sheets

Related U.S. Application Data continuation of application No. 15/337,884, filed on Oct. 28, 2016, now Pat. No. 10,346,802.

(60) Provisional application No. 62/247,510, filed on Oct. 28, 2015.

(56) References Cited

U.S. PATENT DOCUMENTS

| | | | | |
|---|---|---|---|---|
| 6,735,580 | B1* | 5/2004 | Li | G06N 3/049 706/30 |
| 7,409,356 | B1* | 8/2008 | Geddes | G06Q 10/063 705/7.11 |
| 9,947,033 | B1* | 4/2018 | Stickle | G06Q 30/0601 |
| 10,346,802 | B2* | 7/2019 | Ceppi | G06T 11/206 |
| 10,511,683 | B2* | 12/2019 | Busatta | H04L 67/568 |
| 10,902,186 | B2* | 1/2021 | Barton | G06F 40/154 |
| 10,922,655 | B2* | 2/2021 | Ceppi | H04L 67/1097 |
| 11,574,286 | B2* | 2/2023 | Ceppi | H04L 67/1097 |
| 11,853,970 | B2* | 12/2023 | Ceppi | H04L 67/1097 |
| 2004/0133500 | A1* | 7/2004 | Thompson | G06Q 40/04 705/37 |
| 2004/0225592 | A1* | 11/2004 | Churquina | G06Q 40/04 702/179 |
| 2013/0080200 | A1* | 3/2013 | Connolly | G06Q 10/08 705/7.12 |
| 2014/0015837 | A1* | 1/2014 | Soshin | G06T 11/206 345/440 |
| 2014/0194208 | A1* | 7/2014 | Splaine | G06Q 30/02 463/42 |
| 2014/0257922 | A1* | 9/2014 | Jouhikainen | G06Q 30/0201 705/7.29 |
| 2014/0278706 | A1* | 9/2014 | Leidner | G06Q 10/06315 705/7.25 |
| 2014/0282586 | A1* | 9/2014 | Shear | G06F 9/5072 718/104 |
| 2015/0095105 | A1* | 4/2015 | Fitts | G06Q 30/0201 705/7.29 |
| 2015/0120700 | A1* | 4/2015 | Holm | G06F 16/248 707/722 |
| 2015/0286684 | A1* | 10/2015 | Heinz | G06F 16/24568 707/769 |
| 2015/0379602 | A1* | 12/2015 | Gupta | G06Q 30/0617 705/26.43 |
| 2015/0379603 | A1* | 12/2015 | Gupta | G06Q 30/0617 705/26.43 |
| 2016/0019661 | A1* | 1/2016 | Bouganim | G06Q 50/01 705/319 |
| 2017/0053352 | A1* | 2/2017 | Hill | G06Q 40/04 |
| 2017/0124515 | A1* | 5/2017 | Ceppi | H04L 67/1097 |
| 2017/0302754 | A1* | 10/2017 | Busatta | G06F 16/972 |
| 2018/0268253 | A1* | 9/2018 | Hoffman | G06V 10/761 |
| 2018/0324279 | A1* | 11/2018 | Barton | G06Q 10/0633 |
| 2018/0349362 | A1* | 12/2018 | Sharp | G06F 16/14 |
| 2019/0138562 | A1* | 5/2019 | Serena | H04L 67/10 |
| 2019/0295039 | A1* | 9/2019 | Ceppi | G06Q 10/103 |
| 2021/0182794 | A1* | 6/2021 | Ceppi | G06Q 10/103 |
| 2023/0186245 | A1* | 6/2023 | Ceppi | H04L 67/1097 709/219 |
| 2024/0119418 | A1* | 4/2024 | Ceppi | G06T 11/206 |

* cited by examiner

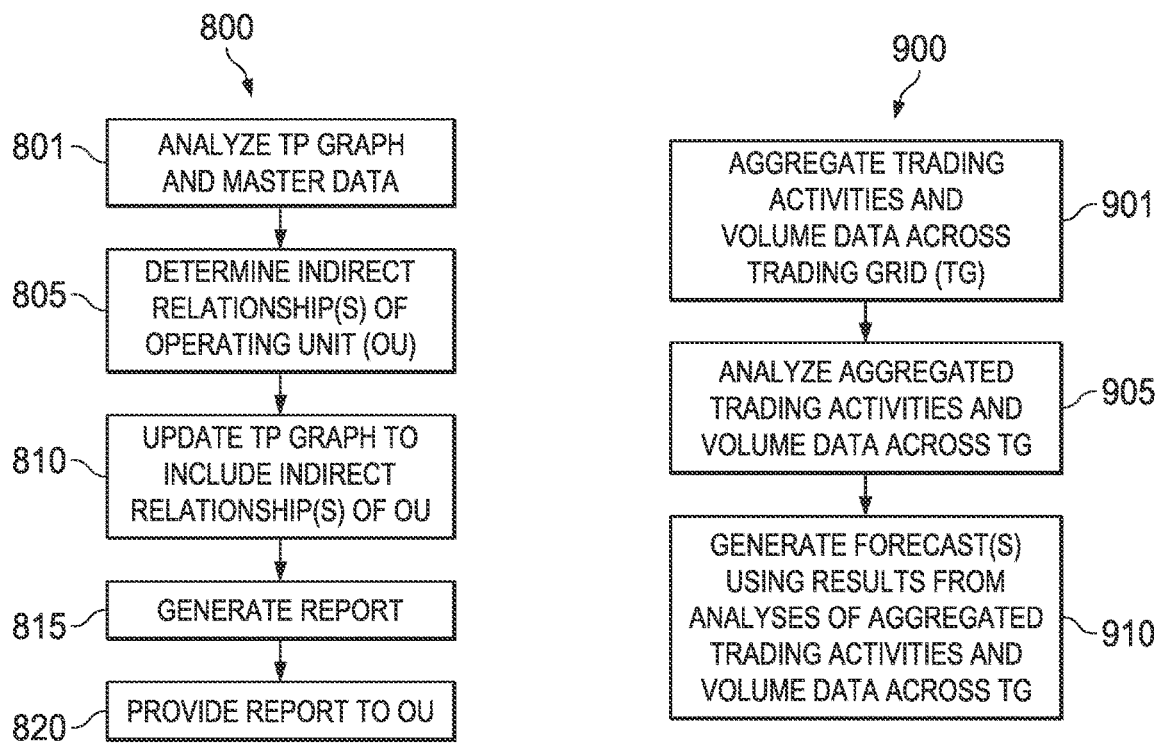
FIG. 8
FIG. 9
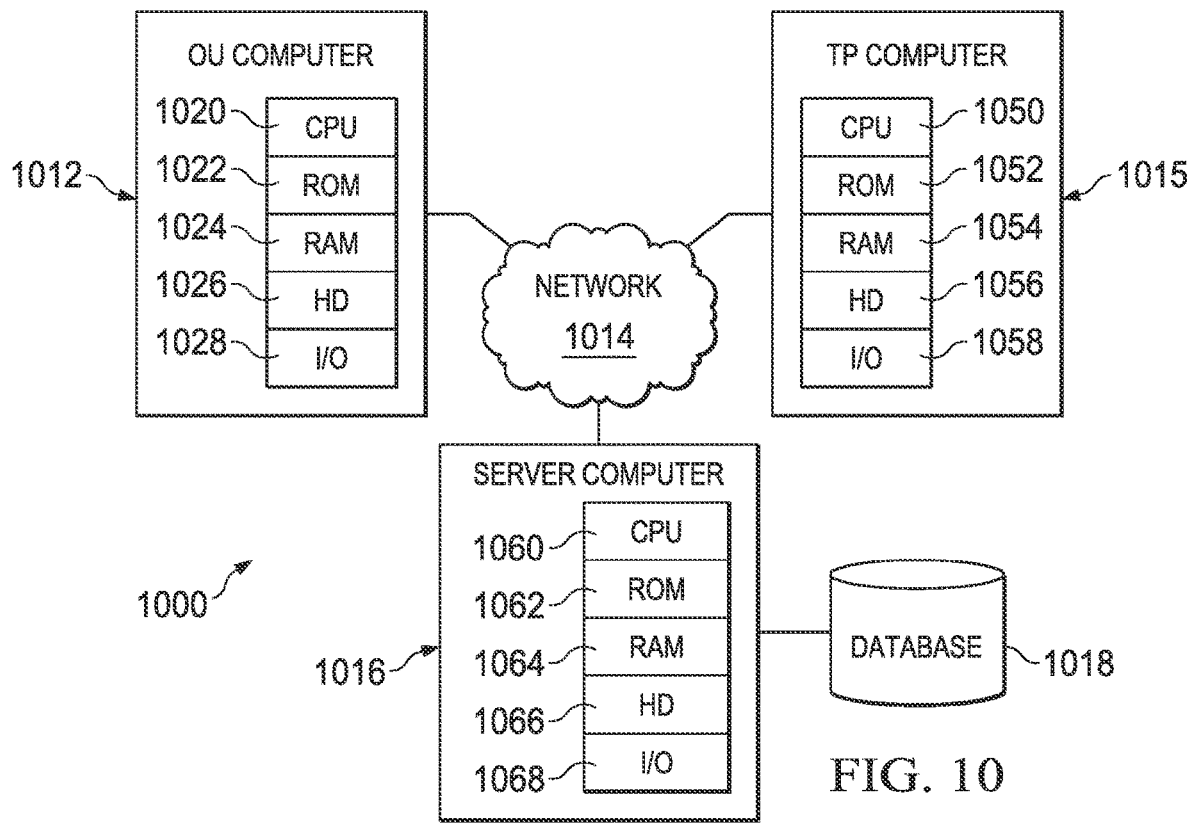
FIG. 10

TRADING PARTNER RELATIONSHIP GRAPH FOR INFORMATION EXCHANGE PLATFORM

CROSS-REFERENCE TO RELATED APPLICATIONS

This application is a continuation of, and claims a benefit of priority under 35 U.S.C. § 120 from, U.S. patent application Ser. No. 18/165,149, filed Feb. 6, 2013, issued as U.S. Pat. No. 11,853,970, entitled "TRADING PARTNER RELATIONSHIP GRAPH FOR INFORMATION EXCHANGE PLATFORM," which is a continuation of, and claims a benefit of priority under 35 U.S.C. § 120 from, U.S. patent application Ser. No. 17/175,436, filed Feb. 12, 2021, issued as U.S. Pat. No. 11,574,286, entitled "TRADING PARTNER RELATIONSHIP GRAPH FOR INFORMATION EXCHANGE PLATFORM," which is a continuation of, and claims a benefit of priority under 35 U.S.C. § 120 from, U.S. patent application Ser. No. 16/424,060, filed May 28, 2019, now U.S. Pat. No. 10,922,655, entitled "TRADING PARTNER RELATIONSHIP GRAPH FOR INFORMATION EXCHANGE PLATFORM," which is a continuation of, and claims a benefit of priority under 35 U.S.C. § 120 from, U.S. patent application Ser. No. 15/337,884, filed Oct. 28, 2016, now U.S. Pat. No. 10,346,802, entitled "TRADING PARTNER RELATIONSHIP GRAPH FOR INFORMATION EXCHANGE PLATFORM," which claims a benefit of priority from U.S. Provisional Application No. 62/247,510, filed Oct. 28, 2015, entitled "TRADING PARTNER RELATIONSHIP GRAPH FOR INFORMATION EXCHANGE PLATFORM," all of which are fully incorporated by reference herein for all purposes.

TECHNICAL FIELD

This disclosure relates generally to supply chain integration, synchronization and collaboration solutions. More particularly, this disclosure relates to an information exchange platform providing operating units with supply chain integration, synchronization and collaboration solutions. Even more particularly, this disclosure relates to systems, methods, and computer program products for graphing relationships among operating units that use the information exchange platform and for facilitating exchange of information between and among such operating units based on particulars in their relationships.

SUMMARY OF THE DISCLOSURE

Embodiments disclosed herein relate to an information exchange platform having the necessary resources (e.g., hardware, software, personnel, etc.) to provide supply chain integration, synchronization and collaboration services (referred to herein as managed services) that enable the real-time flow or exchange of information between and among operating units in a network environment. Examples of operating units may include enterprises, corporations, companies, agencies, etc. An example of a network environment may include a cloud computing environment. OpenText GXS Trading Grid® (hereinafter referred to as the Trading Grid or TG) is an example of an information exchange platform. Examples of managed services may include data (e.g., a document) tracking, messaging, document transformation, regulatory compliance, encryption, data manipulation, etc.

Operating units wishing to use the information exchange platform may have disparate format/configuration requirements, standards preferences, spoken languages, and/or geographic locations spanning multiple cities, countries, or even continents. Given the vast amounts of data and operation complexities involved in managed services, it can be extremely difficult and/or prohibitively expensive for an operator of the information exchange platform to provide a variety of managed services, keep track of all the activities by all the operating units and their particular requirements, preferences, etc. at all times and across the entire information exchange platform, process all their requests submitted through the variety of managed services, and deliver information products such as supply orders or invoices in an accurate, efficient, timely, and secure manner.

In some embodiments, a relationship-based document processing method may include receiving a request from an operating unit to send data to an information trading partner of the operating unit. The request may be received by a system operating on an information exchange platform. As will be explained in detail below, the operating unit and the information trading partner may be in a community where the operating unit is designated by the system as an owner of the community. The system may determine a relationship between the operating unit and the information trading partner using a trading partner graph. In the context of this disclosure, a trading partner graph refers to a representation of a set of objects representing operating units where some pairs of the objects are connected by links indicating relationships of these operating units. Thus, the community may represent a portion of the trading partner graph and define a boundary representing an extent or scope of relationships from the perspective of a particular operating unit.

According to embodiments, the trading partner graph can be maintained, updated, and/or controlled by the system independently of the operating unit and the information trading partner of the operating unit. In some embodiments, the trading partner graph may be stored in a database and the system may access the trading partner graph by querying the database. Master data associated with the operating unit, which may be stored in another database, may comprise a master data object for the operating unit and a façade for the information trading partner of the operating unit in the community. The façade may reference the master data object and describe the information trading partner of the operating unit in context of the community, including configuration information required for computer-to-computer interchange of information (e.g., formatted messages, documents, any content and/or data provided by the operating unit or by their information trading partner, any content and/or data generated by the system for the operating unit or their information trading partner, etc.) between the operating unit and their information trading partner of the operating unit. Specifically, the relationship between the operating unit and the information trading partner of the operating unit is described by the operating unit and represented in the trading partner graph that is maintained, updated, or otherwise controlled by the system.

The system may route or produce the information to be exchanged to a system component such as an orchestration component based on the relationship between the operating unit and their information trading partner as indicated by the trading partner graph. The orchestration component may orchestrate various processes such that the information to be exchanged is appropriately processed based on instructions associated with the relationship. Example processes or functions that may be performed on the information to be exchanged may include, for instance, decompression, translation, formatting, and/or validation. The system may deliver or otherwise exchange the information thus processed to the information trading partner of the operating unit.

In one embodiment, the system may comprise a processor, a non-transitory computer-readable storage medium, and stored instructions translatable by the processor to perform a method substantially as described herein. Another embodiment comprises a computer program product having a non-transitory computer-readable storage medium storing instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 8 is a flow diagram illustrating an example of a method of using a trading partner graph to generate a custom report for a particular operating unit according to some embodiments.

FIG. 9 is a flow diagram illustrating an example of a method of using a trading partner graph to generate a global outlook or forecast according to some embodiments.

FIG. 10 depicts a diagrammatic representation of an example of a computing environment where embodiments disclosed may be implemented.

DETAILED DESCRIPTION

Figure 1A:
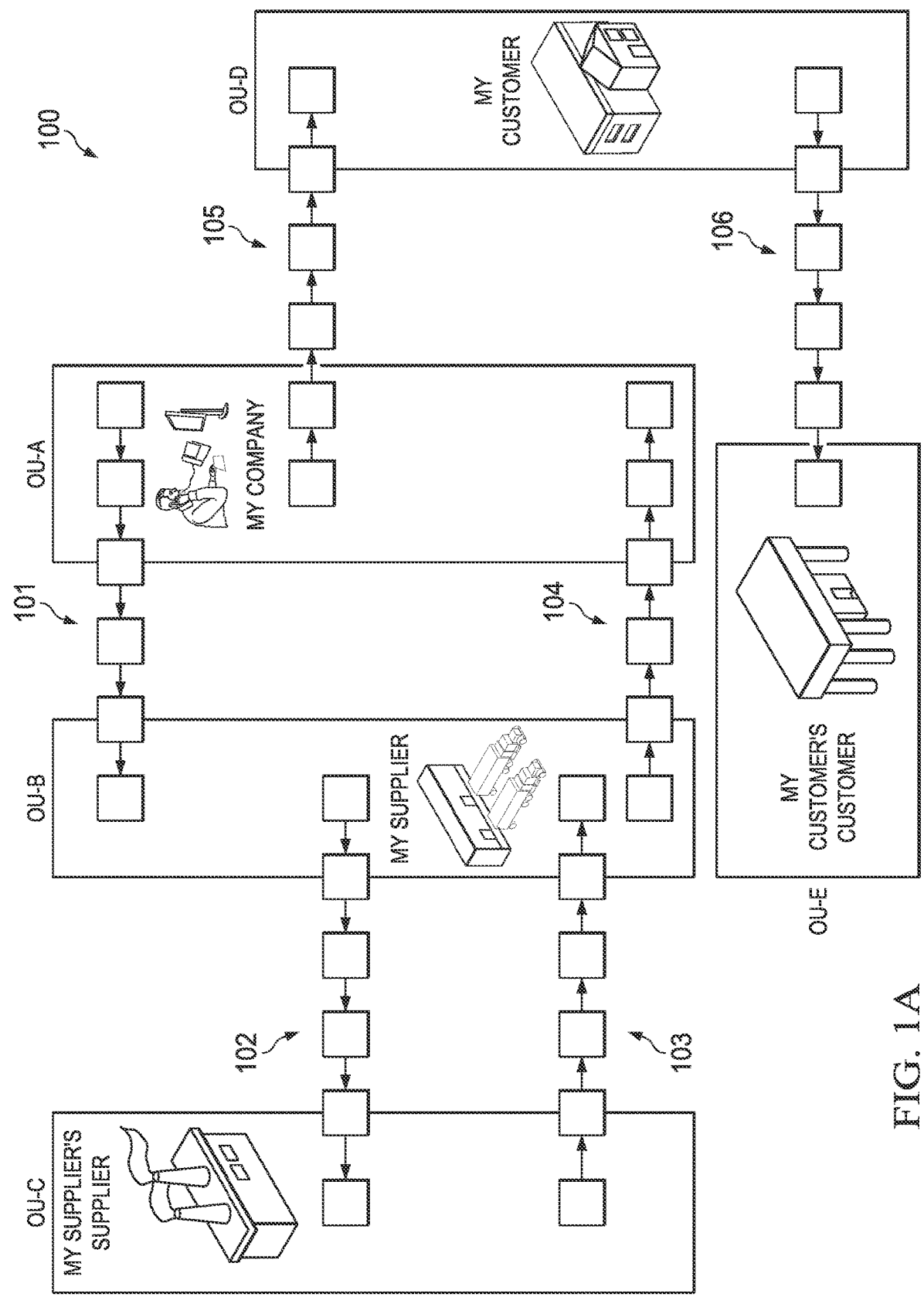
FIG. 1A depicts a diagrammatic representation of an example of a supply chain network having a plurality of operating units in accordance with one embodiment.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, embodiments provide a system operating on an information exchange platform. The system includes a plurality of document-centric applications for facilitating the real-time flow or exchange of information between operating units regardless of standards preferences, spoken languages, or geographic locations. For example, a portion of the plurality of document-centric applications may provide managed services such as document tracking, messaging, document transformation, regulatory compliance, encryption, data manipulation, etc.

In this disclosure, the term "document-centric applications" refers to a class of applications configured to run on the information exchange platform and provide at least one of the following capabilities:

1) Facilitate the electronic exchange of documents among two or more operating units (referred to herein as information trading partners or TPs), by:
   a. Allowing the Sender TP to submit, or the Recipient TP to receive, data (e.g., a document) via any of the supported communication protocols. Usually, these exchanges are performed "machine to machine".

b. Transforming the source document(s) from a Sender TP into one or more documents in a format understood by the Recipient(s) TP(s).
c. Allowing a Person ascribed to a TP to enter, edit, validate, send or receive a document using forms via web or mobile browsers.
2) Archival (persistent storage) and retrieval of documents.
3) Document encryption/decryption/tokenization for transfer or storage.
4) Document-centric logic for functions like:
   a. Validate the quality, completeness, accuracy or integrity of a document against a set of rules
   b. "Turn-around" a document of a given type into a pre-filled document of a derived document type, for example, to turn an Order into an Invoice.
   c. Common transaction functions for a given document type, for example, signature of an Invoice, currency conversion of an Order.
5) Search and filter a collection of documents.
6) Orchestrate end-to-end global transaction processes by orchestrating its constituent document exchanges (process strands).
7) Provide visibility into the document exchange process, including monitoring and alerting for exception conditions, that is comprehensive Operational Analytics.
8) Provide facilities for deep introspection of Documents for deriving transaction analytics, including reporting, ad-hoc querying and predictive analytics.
9) Service application programming interfaces (APIs) to access and extend programmatically the application functionality A "document" in this context refers to information encoded in digital (electronic) form for the purpose of exchanging the information with another party. Skilled artisans appreciate that the term "document" is used herein for illustrative purposes and is not limited to any particular type of computer file created using an application program. Furthermore, the encoding of the document may also include metadata about its content, destination, operational parameters, permissions, etc. Examples of documents in this context can include any formatted messages, electronic data interchange (EDI)-encoded formats, all of the traditional office formats (Word, Excel, PowerPoint, etc.), computer-aided design and computer-aided manufacturing (CAD/CAM) files, multimedia content including video, audio, image, and/or text, and even content that could be provided by, for instance, a device participating in an Internet of Things network.

Skilled artisans also appreciate that EDI is an electronic communication method that provides standards for exchanging data via any electronic means and that is defined as the computer-to-computer interchange of formatted messages by agreed message standards. EDI distinguishes mere electronic communication or data exchange in that in EDI, the usual processing of received messages is by computer only. By adhering to the same message standard, TPs, even in two different countries, can electronically exchange documents (e.g., purchase orders, invoices, acknowledgement, notices, etc.).

In a supply chain network, documents represent the "information supply chain" that mirrors a physical supply chain, acting as proxies for the actual physical goods or actions of a commercial transaction. In some cases, a document can be the actual good that is being transacted. For example, in a digital supply chain in areas like media, collaborative design, gaming, financial instruments, etc., a document often is the actual good that is being transacted. An example of a supply chain network is illustrated in FIG. 1A.

As illustrated in FIG. 1A, supply chain network 100 may include a plurality of operating units (OUs) including "My Company" (OU-A), "My Supplier" (OU-B), "My Supplier's Supplier" (OU-C), "My Customer" (OU-D), and "My Customer's Customer" (OU-E). In this disclosure, an operating unit (OU) represents a company, a corporation, an enterprise, an entity, or a division thereof.

Notice that in FIG. 1A, supply chain network 100 reflects a perspective of OU-A "My Company." That is, on the one hand, OU-A may have specific knowledge about OU-B and OU-D because OU-B and OU-D are TPs of OU-A. That is, OU-B and OU-D each established and have a relationship with OU-A. On the other hand, OU-A may know of OU-C through OU-B, a supplier of OU-A, but OU-A may not have specific knowledge about OU-C (because OU-A and OU-C do not have a direct relationship). Likewise, OU-A may know of OU-E through OU-D, a customer of OU-A, but OU-A may not have specific knowledge about OU-E (again, because OU-A and OU-E do not have a direct relationship). Therefore, the levels of knowledge that OU-A may have about each OU in supply chain network 100 may vary greatly from OU to OU, depending upon their relationships with one another.

As an example, suppose in building a product OU-A may need an item (or a part) of which OU-B is a supplier. Accordingly, OU-A may send an Order (a type of document supported by supply chain network 100) to OU-B (101). As explained below, this communication may be accomplished via a system operating on an information exchange platform such as the Trading Grid disclosed herein. OU-B, which is a TP of OU-A, may receive the Order from OU-A and work to fulfill the Order from OU-A. In doing so, OU-B may need one or more items from OU-C. Accordingly, OU-B may send an Order (which may or may not combine the Order from OU-A with any other Order from any of OU-B's own TPs) to OU-C (102). OU-C, in this case, is a TP of OU-B, but not a TP of OU-A. OU-C fulfills the Order from OU-B (103) which, in turn, fulfills the Order from OU-A (104). OU-A then completes and provides the product to its customer, OU-D (105). OU-D, which is a TP of OU-A, may use the product from OU-A to fulfill an Order from its own customer, OU-E (106). OU-E, in this case, is a TP of OU-D, but not a TP of OU-A.

Figure 1B:
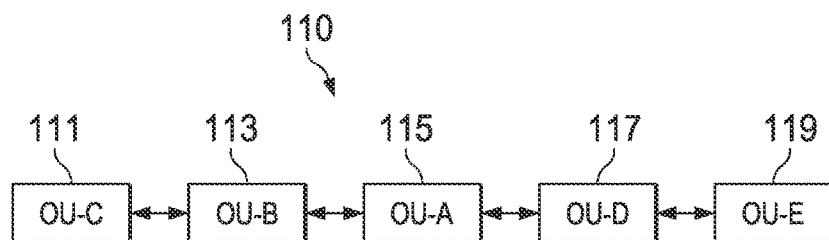
FIG. 1B depicts a diagrammatic representation of an example of a trading partner graph illustrating the relationships of the plurality of operating units in the supply chain network shown in FIG. 1A.

FIG. 1B depicts a diagrammatic representation of an example of a TP graph 110 having nodes 111, 113, 115, 117, and 119 illustrating the relationships of the OUs in supply chain network 100 shown in FIG. 1A. As illustrated in FIG. 1B, although both OU-B and OU-D are direct TPs of OU-A, they are not direct TPs with each other and only know of each other through OU-A. Therefore, neither OU-B nor OU-D may have specific knowledge about each other. Likewise, although both OU-C and OU-A are direct TPs of OU-B, they are not direct TPs with each other and only know of each other through OU-B. Therefore, neither OU-C nor OU-A may have specific knowledge about each other. Similarly, although both OU-A and OU-E are direct TPs of OU-D, they are not direct TPs with each other and only know of each other through OU-D. Therefore, neither OU-A nor OU-E may have specific knowledge about each other.

For the purpose of illustration, FIGS. 1A-1B show supply chain network 100 with only five OUs. Skilled artisans appreciate that a supply chain network may involve hundreds or even thousands of OUs. Therefore, potential relationships amongst OUs in a supply chain network can be quite complex and complicated. Moreover, relationships amongst the OUs in a supply chain network can change rapidly and significantly. As can be expected, it can be very challenging for a system operating on an information exchange platform to keep track of relationships in a supply chain network so that the system can facilitate the real-time flow or exchange of information between these OUs in a supply chain network. Further complicating the matter is that the system may need to support multiple supply chain networks and multiple OUs may be involved in any one of the multiple supply chain networks that the system supports.

In embodiments disclosed herein, the interconnection of relationships (direct and indirect) among OUs in a supply chain network may be represented in a Trading Partner Graph (TP Graph). A TP Graph can be viewed as a single logical graph that can be distributed and that can reside on physically separate storage devices operating in a network environment. According to embodiments, a TP Graph is a representation of all of the Trading Grid OUs, their TPs, and the relationships between them. Such a TP graph can be very useful for Enterprise Information Management (EIM) in producing, delivering, and/or exchanging information. While a system can be built to utilize a TP graph for exchanging information over a network (e.g., the Trading Grid), the Trading Grid is distinctly different from a traditional messaging or message delivery systems. One reason is that the Trading Grid is relationship-driven, facilitating a meaningful bi-directional communication between TPs. The Trading Grid itself creates a relationship with each OU. The relationships among trading partners on the Trading Grid can be organically extended as each trading partner evolves and/or grows over time, for example, from a basic trading of contact information to a more complex information exchange involving multiple network based services such as authentication, validation, certification, encryption, compression, data conversion, etc. provided by the Trading Grid. Thus, while the Trading Grid can deliver messages, files, and documents alike, it is infinitely more complex, powerful, and sophisticated than a traditional messaging system.

In some embodiments, a TP Graph may represent a superset of OUs and their trading relationships. Each OU may be represented in the TP Graph by a single node.

Referring to FIG. 1B as an example, if OU-B and OU-D both trade with OU-A, they are trading with the same OU-A instead of two separate nodes that share a similar name. However, not all OUs in a TP Graph may be registered with the system. Furthermore, OUs may join the system at different times. Thus, the TP Graph may not represent a complete supply chain network. Rather, it represents OUs, their TPs, and their relationships in the Trading Grid (which, as explained above, is an example implementation of an information exchange platform) supported by the system. This is further explained below.

The Trading Grid can interpret the TP Graph, enable the execution of OU-to-OU processes by document-centric applications (e.g., information exchange, survey management, content management, analytics, etc.), and provide a complete visibility of full operational intelligence of such processes without compromising on data security, allowing OUs to protect their private relationships with their TPs while benefiting from the network effects of a connected Grid. According to embodiments, this is realized by implementing an OU-centric community paradigm, rather than a social network paradigm. Skilled artisans appreciate that the social network paradigm employed by networking sites often allows individuals to connect and/or be friends with as many other individuals as they wish, or to join and/or follow as many groups as they like. This does not work well in the enterprise world where OUs could be TPs as well as actual or potential competitors. For example, OU-A could be negotiating a deal with OU-B and may not want OU-B to know that it is also getting quotes from other OUs.

A TP is in a relationship with another TP for a particular purpose and the relationship is characterized by a methodology that dictates how and/or what information is to be processed and exchanged. Each relationship is meaningful and purposeful—e.g., to exchange documents of a certain type in this format. Relationships amongst TPs are less mutable—an OU cannot just "friend," "follow," "unfriend," or "un-follow" their TP with a click of a button on a web site. This is quite unlike social networking sites where connections among users are generic in nature and often do not need to have any purpose or imply purposeful relationships. Such social relationships or casual connections also do not dictate how comments and posts are processed by the social networking sites.

Figure 1C:
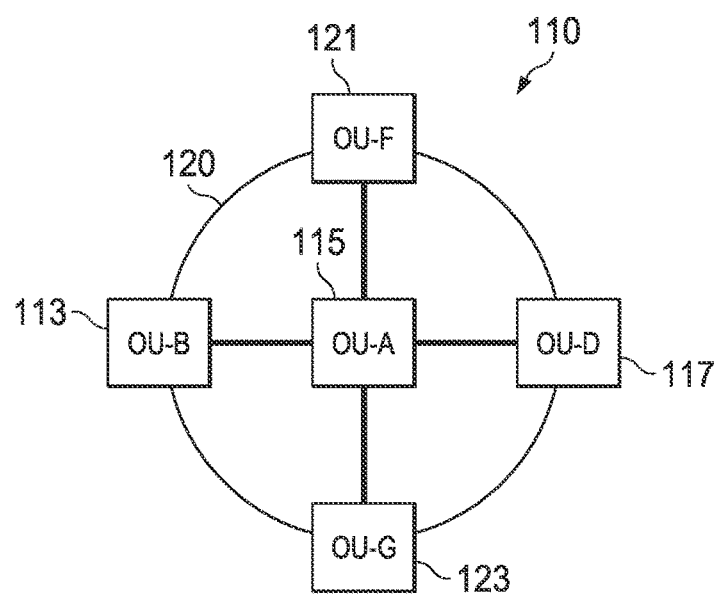
FIG. 1C depicts a diagrammatic representation of an example of a community of information trading partners and their relationships from the perspective of an operating unit in the supply chain network shown in FIG. 1A.
Figure 1D:
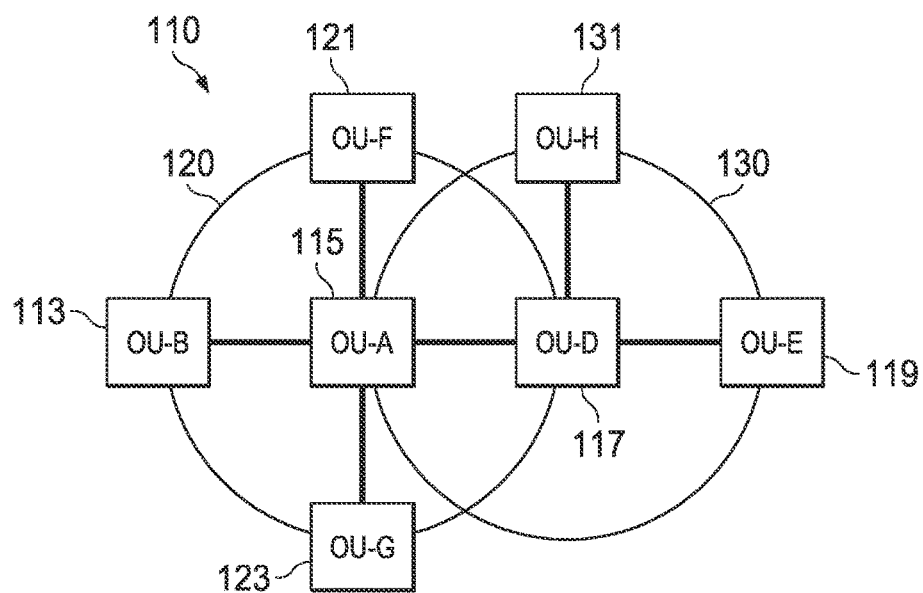
FIG. 1D depicts a diagrammatic representation of an example of relationships between multiple communities of information trading partners in the supply chain network shown in FIG. 1A.
Figure 1E:
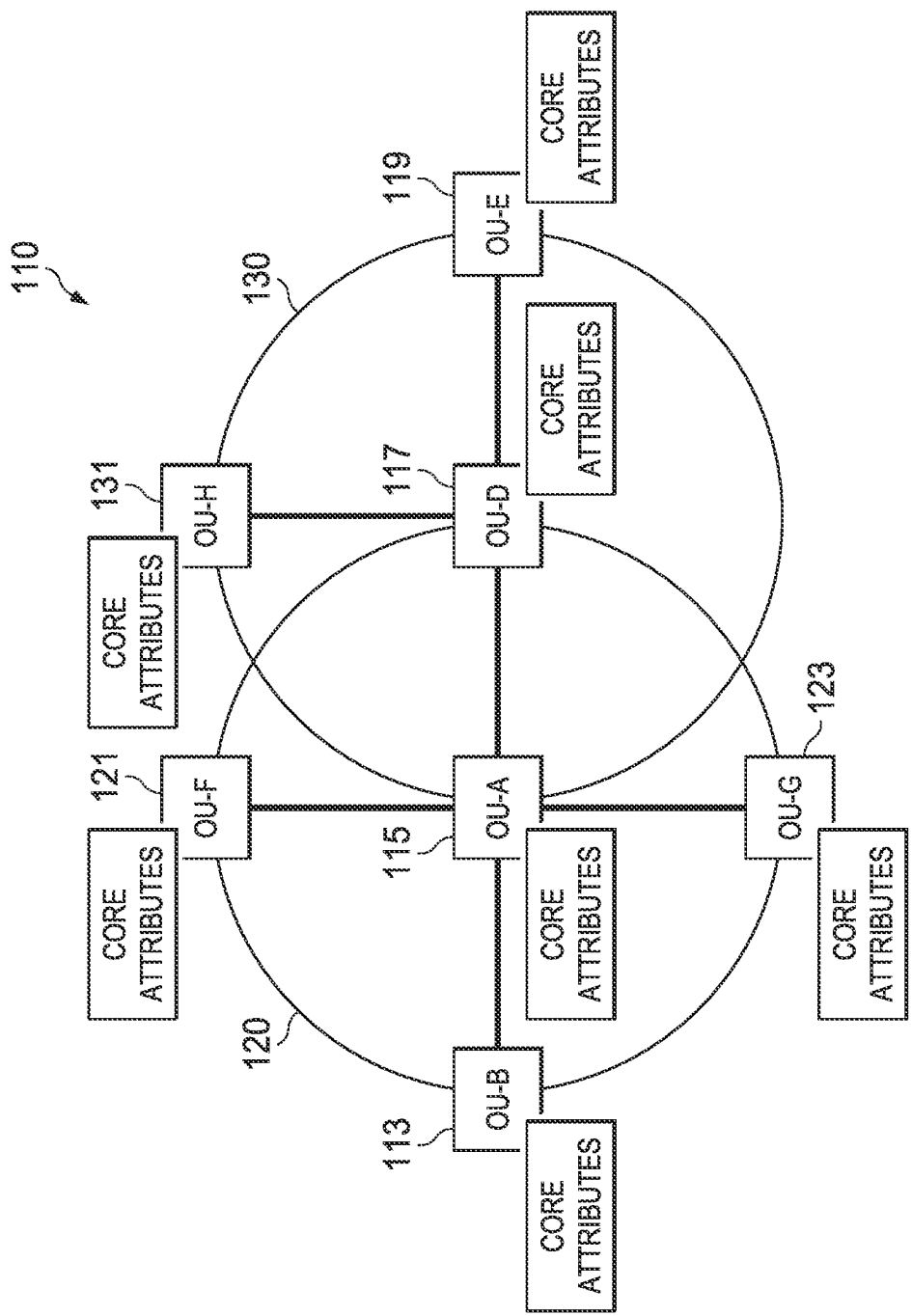
FIG. 1E depicts a more detailed view of FIG. 1D, where each operating unit is associated with a set of core attributes.

The OU-centric community paradigm, which is exemplified in FIGS. 1C-1E, allows an OU to leverage services provided by the Trading Grid to communicate with their TPs and provides a mechanism for defining, managing, and utilizing private relationships between that particular OU and its TPs. FIG. 1C depicts a diagrammatic representation of an example of a community 120 from the perspective of OU-A.

In this disclosure, a community represents a subset of the overall TP Graph from the perspective of a single OU (e.g., community 120 is a subset of TP Graph 110 from the perspective of OU-A). In this context, a "community" represents an extent or scope of relationships from the perspective of that single OU— the OU's "universe." In the example of FIG. 1C, from the perspective of OU-A, community 120 consists of a node 115 representing OU-A and nodes 113, 117, 121, and 123 individually connected to node 115, representing the relationships of all of the TPs of OU-A (which, in the example of FIG. 1C, include OU-B, OU-D, OU-F, and OU-G). These TPs of OU-A can be considered connected in the sense that they all communicate with OU-A via the Trading Grid and they all have a relationship with OU-A. However, as explained above, a TP of OU-A may only know that they are exchanging information with OU-A via the Trading Grid and may have no knowledge about other TPs in community 120 and/or their private relationships with OU-A. This is further illustrated in FIG. 1D.

As a non-limiting example, FIG. 1D depicts a diagrammatic representation of an example of a community 130 from the perspective OU-D, in addition to the OU-A centric community 120 shown in FIG. 1C. Following the above example, OU-D is a TP of OU-A in community 120. From the perspective of OU-D, OU-A is a TP of OU-D in community 130. In community 130, OU-D is the center of the universe (which is defined by community 130) and therefore is represented by a center node 117, with nodes 115, 119, and 131 radially and individually connected to node 117. In this example, nodes 115, 119, and 131 represent all of the TPs of OU-D (which, in the example of FIG. 1D, include OU-A, OU-E, and OU-H).

From a system perspective, multi-tenancy in a Trading Grid can be represented by the combination of many OU-centric communities, each of which appears as a single-tenant to the respective community owners. In the case of OU-A, community 120 consists of all of OU-A's relationships to their TPs and services provided by the system that can be applied to those relationships. Similarly, in the case of OU-D, community 130 consists of all of OU-D's relationships to their TPs and services provided by the system that can be applied to those relationships.

From the perspective of OU-D, community 130 is all about them. They have no visibility to OUs outside of community 130. That is, OU-D does not have visibility to community 120 and does not have visibility to relationships in which they have no role. Likewise, from the perspective of OU-A, community 120 is all about them. They have no visibility to OUs outside of community 120. That is, OU-A does not have visibility to community 130 and does not have visibility to relationships in which they have no role.

As illustrated in FIG. 1E, each OU can be associated with a set of core attributes. Core attributes may diff from OU to OU depending upon the information process systems and applications to which an OU is subscribed. As a non-limiting example, core attributes related to the management of an OU's profile may include identity, location, key contacts and users, subscriptions, etc. According to embodiments, various profile management systems and/or identity management systems may be suitably implemented.

Figure 2:
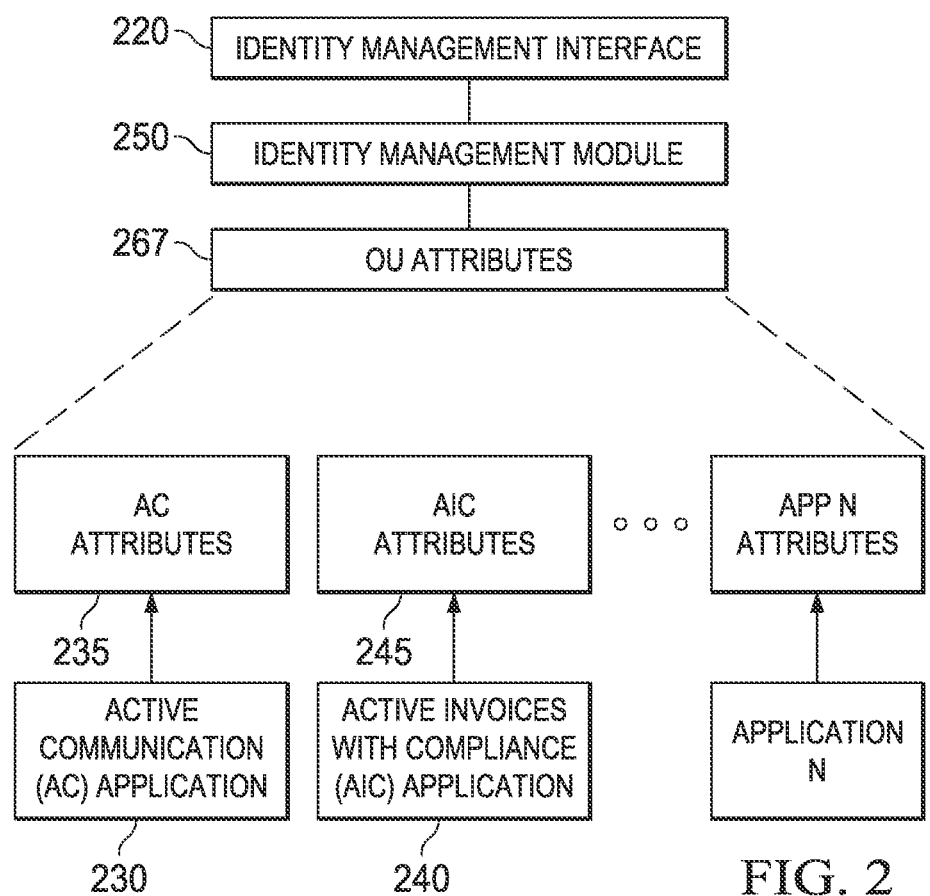
FIG. 2 depicts a diagrammatic representation of an example of a system operating on an information exchange platform for identity management of operating units according to some embodiments.

FIG. 2 depicts a diagrammatic representation of an example of a system operating on an information exchange platform for identity management of operating units according to some embodiments. In this example, OU-specific attributes 267 can be managed using an identity management module 250. More specifically, an authorized user of an OU may access management module 250 via an identity management interface 220 to provide and edit OU-specific attributes 267. Additionally, various applications such as applications 230 and 240 may enrich OU-specific attributes 267 by adding application-specific attributes such as attributes 235 and 245.

Figure 3A:
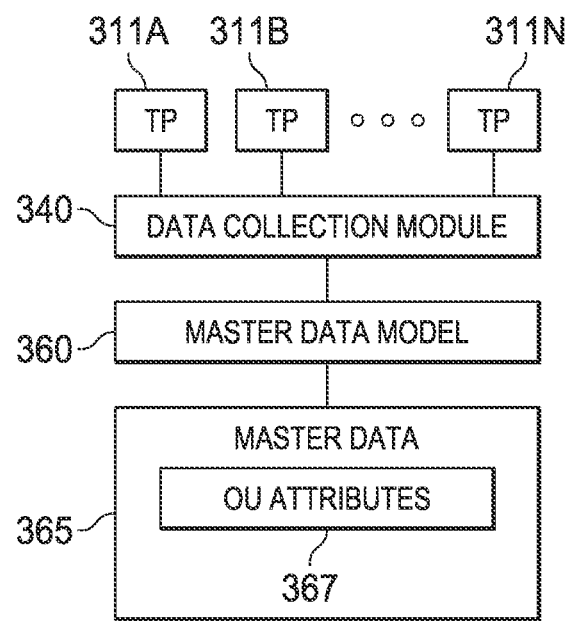
FIG. 3A depicts a diagrammatic representation of an example of a system operating on an information exchange platform that implements a master data model for collection and management of master data of operating units according to some embodiments.

Depending upon the complexity, other types of data models may be suitably implemented. FIG. 3A depicts a diagrammatic representation of an example of a system operating on an information exchange platform that implements a master data model for collection and management of master data of operating units according to some embodiments. As skilled artisans can appreciate, the information attributes of a TP can differ greatly from system to system. Although component-specific tools may be used in some cases to manage specific areas of the attribute space, due at least to the vast amount of data and complicated relationships in a supply chain network, it can be difficult to determine, for instance, for a given OU, who/what are their TPs, what documents they trade, over what protocols, etc. To this end, a master data model 360 may be used to rationalize and unify master data 365 related to TPs (e.g., TP 311A, TP 311B, TP 311N, etc.), including OU-specific attributes 367, so that master data 365 can be leveraged within the Trading Grid's transactional flows as well as the expanding scenarios for community management and analytics.

In some embodiments, a data collection module 340 may be utilized to collect data from TP 311A, TP 311B, . . . , TP 311N, etc. Data collection module 340 may use "provisioning data" in a standardized or unified format (referred to as a data card or, technically, a "service-specific provisioning data instance" (SSPDI)) to describe the data to be collected from TPs.

A SSPDI can be considered a unit, a bundle, or a logical set of information collected via a service provisioning interface (SPI) of the managed services provisioning system. The structure of the SSPDI may vary from implementation to implementation. As an example, one embodiment of a SSPDI may implement a particular JavaScript Object Notation (JSON) schema. JSON is an open standard format that uses human-readable text to transmit data objects consisting of attribute—value pairs. Skilled artisans appreciate that JSON schemas are extensible. The particular JSON schema for the SSPDI feature is extended with significant changes and additions to meet the functional and visual requirements of the special service provisioning interface of the managed services provisioning system. In this example implementation, SSPDIs are special JSON documents.

More specifically, when a service is configured for an OU, a SSPDI interface may be dynamically generated for entry of service-specific provisioning information based at least in part on a service-specific provisioning descriptor associated with the service. A SSPDI can then be generated using the service-specific provisioning information.

The newly generated SSPDI (and any other SSPDIs for the particular OU) can be stored in a SSPDI store (which, in one embodiment, can be implemented in a database) in a staging environment until deployment. As skilled artisans can appreciate, each SSPDI generated and stored in the staging environment may go through a review and approval process for quality assurance and/or compliance reasons.

Once approved, the SSPDI can be deployed on a backend system (see, e.g., FIG. 4) that provides the requested service. The backend system is operable to provide the service to the particular OU by using the SSPDI for the service to process information received from the particular OU. This process can be repeated for each service requested for the OU. That is, as each service is configured for an OU, a corresponding SSPDI is generated. All the SSPDIs thus generated for the services to be used by the particular OU can be deployed to the backend systems that provide the requested services. Additional details and examples of this process and a SSPDI framework can be found in U.S. patent application Ser. No. 15/223,192, filed Jul. 29, 2016, and entitled "SYSTEMS AND METHODS FOR MANAGED SERVICES PROVISIONING USING SERVICE-SPECIFIC PROVISIONING DATA INSTANCES," which is incorporated by reference herein.

Figure 3B:
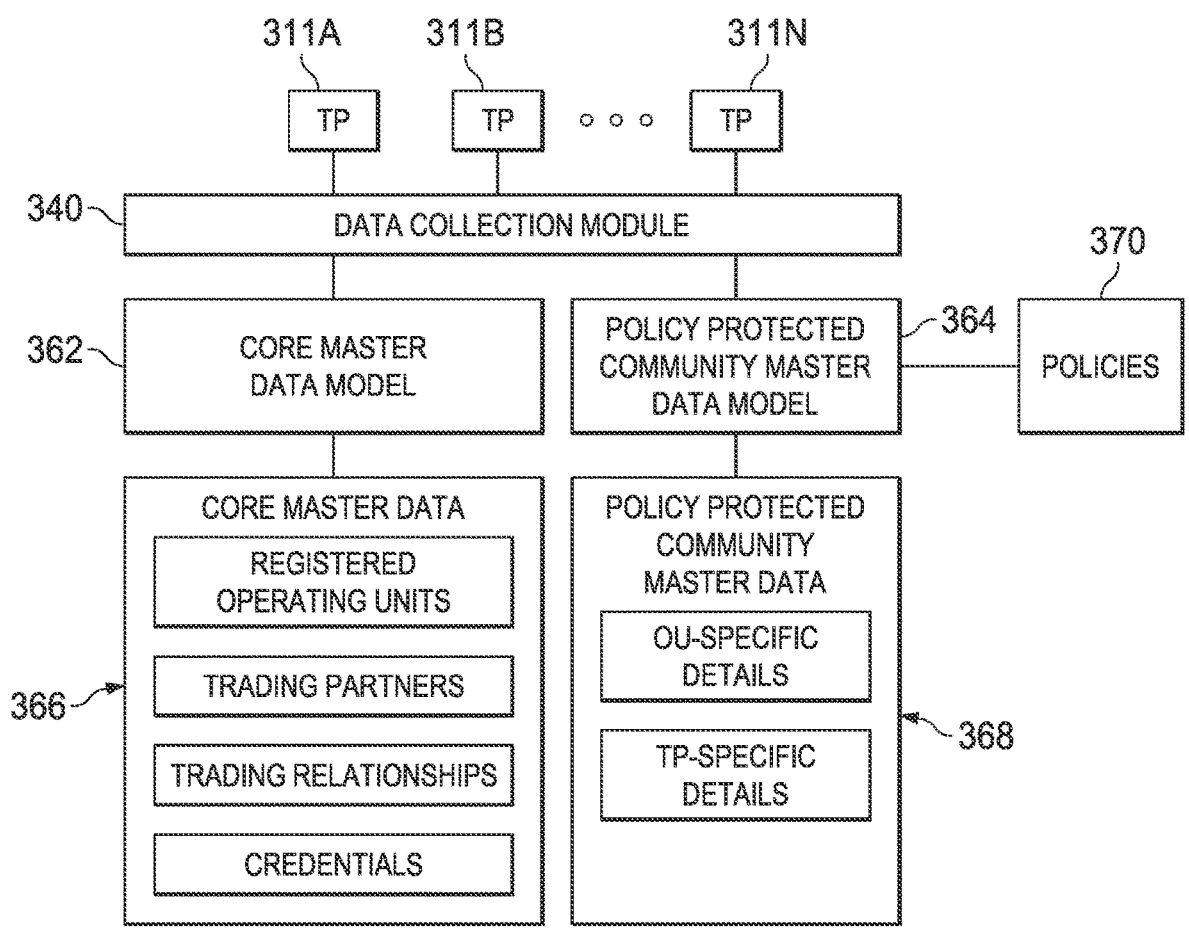
FIG. 3B depicts a diagrammatic representation of an example of a system operating on an information exchange platform that implements multiple master data models including a core master data model and a policy-protected community master data model according to some embodiments.

FIG. 3B depicts a diagrammatic representation of an example of a system operating on an information exchange platform that implements multiple master data models including a core master data model and a policy-protected community master data model according to some embodiments. Following the community-centric paradigm, an OU can manage their own master data and their relationships with their TPs within the confine of a community. However, they cannot view or modify the master data of their TPs. To this end, the system may use a core master data model 362 for management of core master data 366 at the system level, for instance, to keep track of all the OUs registered with the system, their TPs, their trading relationships, their security information such as login credentials, etc. The system may separately use a policy protected community master data model 364 for management of policy protected community master data 368 at the community level based on defined policies 370, for instance, to keep track of OU-specific attributes (e.g., name, address, point of contact or POC, etc.) and their relationships with their OUs in a particular OU-centric community (e.g., TP 311A is a supplier of TP 311B). In some embodiments, a profile record in which an OU describes a TP from the perspective of that particular OU is referred to as a façade and policy protected community master data 368 may comprise community-centric façades (and thus may also be referred to as façade data).

For example, TP 311A may own their own façade(s) to describe their TP(s) in their community and TP 311B may own their own façade(s) to describe their TP(s) in their community. Each façade points to a node in a TP Graph representing an OU thus described. The system maintains and uses such façades to provide services to TP 311A, TP 311B, TP 311N, etc. Related to each OU in the TP Graph is one or more routing/electronic data interchange (EDI) address addresses. When the system implements a particular OU, the system receives a list of TPs from the particular OU in the form of EDI addresses and optionally company names. Often these names/addresses relate to the particular OU's TPs that are external to the system. Therefore, the system may or may not have direct relationships to all of the TPs in the TP Graph.

In some embodiments, a façade can be implemented as an instance (also called an instance object) of a master data object associated with a particular OU. An instance is a specific realization of an object. Thus, a façade has a particular value (realization) and reflects the distinct identity of the master data object. When an EDI address of an OU is first provided to the system, the system may automatically create a master data object (which can be part of core master data 366) and a façade (which can be part of policy protected community master data 368), both of which represent the OU.

As a non-limiting example, the master data object thus created by the system for an OU called "My Company" may include a data structure having at least a data field "Name" which has a value of "My Company". Likewise, the façade thus created by the system for the OU may include a data structure having data fields including a data field "Name" having a value of "My Company". The master data object represents the OU from the perspective of the system and may include the EDI address and any configuration information pertaining to the OU (e.g., collected by data collection module 340). The façade represents the OU from the perspective of a community and contains a pointer that references the master data object.

According to embodiments, an OU that participates in multiple communities may see substantial differences in façades that describe them from one community to the next. This is because communities can have differing custom fields, SaaS applications, orchestrated services, security requirements, etc., and these differences may alter the size and scope of the community's façade. Core master data, however, can transcend communities.

As illustrated in FIG. 3B, master data in a TP Graph can come in two main forms: core master data 366 (e.g., data stored in a master data object) and policy protected community master data 368 (e.g., data stored in a façade). Core master data 366 refers to data that can be considered as facts and not likely to be different depending on the community context. Core master data 368 should also come from, and be managed by, an authoritative source (usually an associated OU itself, for instance, via a user interface of core master data model 362). Policy protected community master data 368 "lives" within each community and is not replicated across compute zones as is core master data. This fact allows community owners to store data in a façade without having to worry that façade data may be copied outside of the compute zone's region. Additional details and example data structures of master data objects and community-centric façades and related discussions on data sovereignty can be found in U.S. patent application Ser. No. 15/241,588, filed Aug. 19, 2016, and entitled "COMMUNITY-CENTRIC FACADE FOR INFORMATION EXCHANGE PLATFORM," which is incorporated by reference herein.

Figure 4:
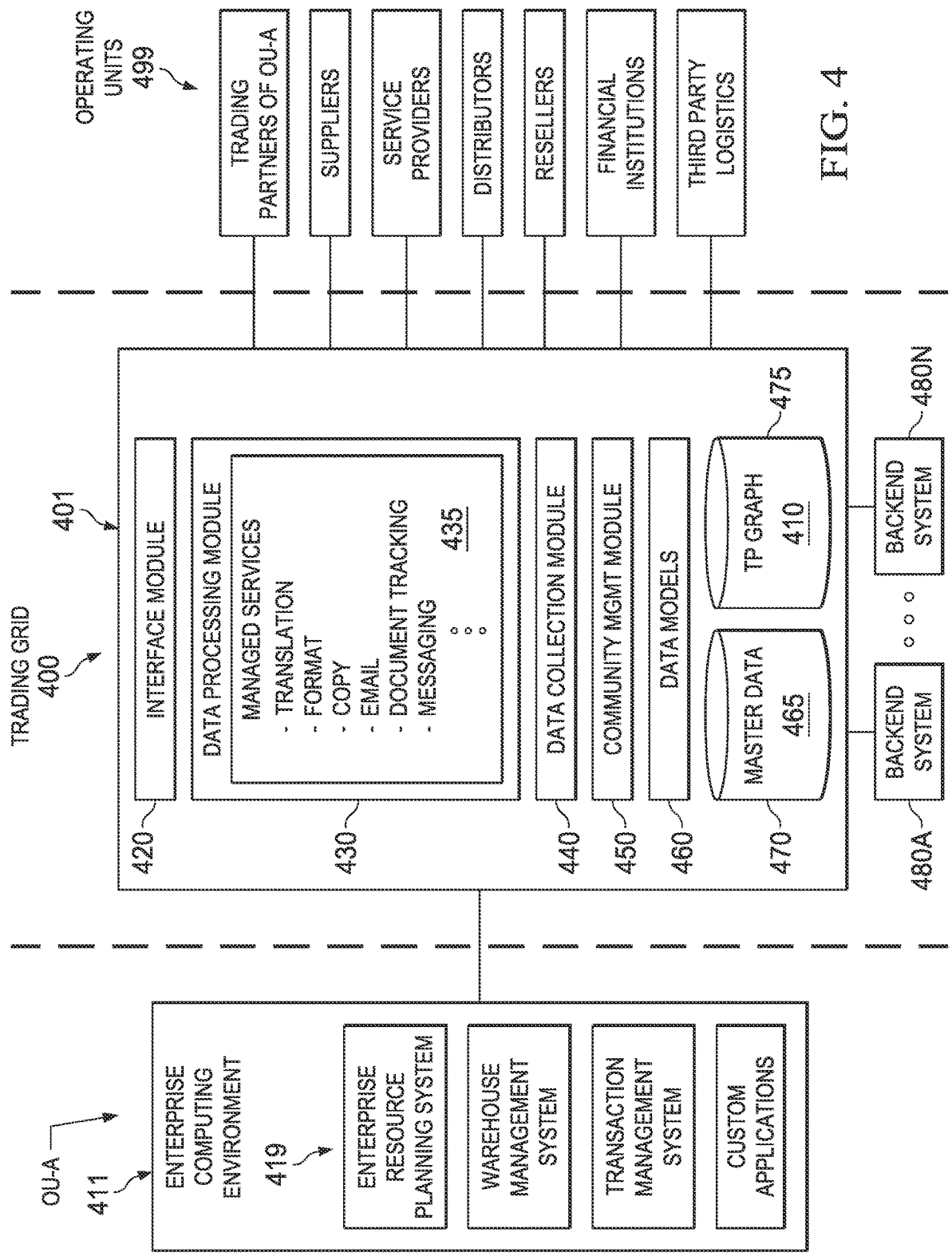
FIG. 4 depicts a diagrammatic representation of an example of an information exchange platform that provides managed services to operating units in a network environment according to some embodiments.

FIG. 4 depicts a diagrammatic representation of an example of a Trading Grid (TG) 400 (which is an implementation of an information exchange platform). A system 401 operating on TG 400 may include a plurality of modules such as an interface module 420, a data processing module 430, a data collection module 440, and a community management module 450. Data processing module 430 may be configured to provide and manage (orchestrate) a very large number (e.g., 50 or more) of services 435 performed by backend systems 480A . . . 480N operating on TG 400. Data collection module 440 may function in the same or similar manner as data collection module 340 described above. Interface module 420 may be configured to provide user interfaces for registered OUs such as OU-A with access to system 401 or a component thereof (e.g., services 435, community management module 450, etc.).

As an example, OU-A may own and operate enterprise computing environment 411 which is separate and independent of TG 400. From the perspective of system 401, OU-A is an enterprise customer and systems 419 of OU-A which utilize services 435 provided by system 401 are client systems of system 401. Client systems 419 operating in enterprise computing environment 411 may use services 435 to communicate with various systems and/or devices operating in computing environments 499 owned and operated by various OUs such as TPs of OU-A. Examples of services 435 may include, but are not limited to, translation services, format services, copy services, email services, document tracking, messaging, document transformation (for consumption by different computers), regulatory compliance (e.g., legal hold, patient records, tax records, employment records, etc.), encryption, data manipulation (e.g., validation), etc.

Community management module 450 may include a façade management tool (application) through which OU-A can access their master data stored in a database 470. Master data 465 may include core master data and façade data that follow different data models 460. As described above, core master data may contain data about an OU that do not change across solution communities, while façade data may contain community-specific data about that particular OU's TPs. System 401 may maintain a TP Graph 410 in a database 475. TP Graph 410 may be a superset of all communities defined by system 401 and may include a plurality of nodes, each representing a single OU that may or may not have a direct relationship with system 401.

Figure 5:
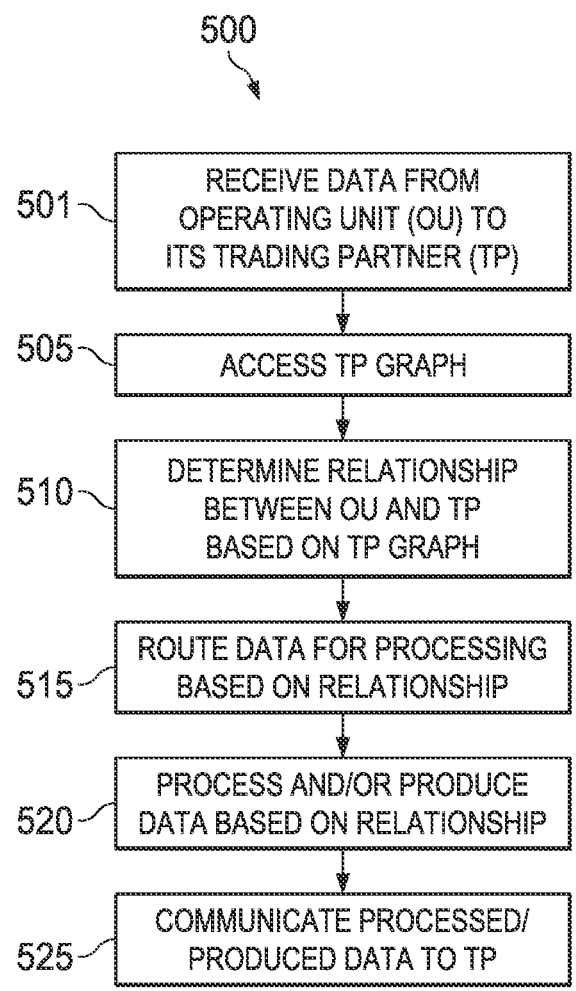
FIG. 5 is a flow diagram illustrating an example of a method of processing a document for delivery using a trading partner graph according to some embodiments.

FIG. 5 is a flow diagram illustrating an example of a method 500 of processing a document for delivery using a trading partner graph such as TP Graph 410. According to some embodiments, a system such as system 401 shown in FIG. 4 may receive a request from a particular OU (e.g., OU-A) wishing to send a document to its TP (501). Unlike an online market place where a seller and a buyer may form a temporary, transactional based relationship, the OU and its TP(s) have an ongoing relationship that is reflected and represented in a TP Graph such as TP Graph 410 managed and maintained by system 401. The system may access the TP Graph (505), for instance, by querying a database such as database 475 where TP Graph 410 is stored or otherwise persisted to obtain community-centric façade data. Skilled artisans appreciate that, while database 475 shown in FIG. 5 represents a logical database containing TP Graph 410, database 475 may actually reside on separate physical storage devices or otherwise distributed across a network.

As described above, façade data may contain community-specific data about the requesting OU's TP and their relationship. Using this community-specific data, the system may determine the particular relationship between the OU and the TP to which the document is to be sent (510). The system may then route the document based on the relationship thus determined (515). For example, the relationship may indicate that the document should be routed to an orchestration component where the document is decompressed, translated, and/or formatted. Additionally, the relationship may indicate how the document is to be processed (520). That is, processing of the document and associated instructions may vary depending upon the relationship between the particular OU and the particular TP of the OU. For example, if the relationship indicates that the document is to be validated, a validation process is performed and, if it is valid, the document is delivered to the TP (525). Such document processing rules are relationship-based so the system in actuality may behave differently responsive to different relationship models. As discussed above, "processing" of the document, in this disclosure, is not limited to decompressing, translating, and/or formatting the document for delivery and can include a multitude of services provided by the Trading Grid, including, and not limited to, generating additional information utilizing the document under processing. For example, the system may employ advanced data science methodologies such as a world cloud generator, a data analytics engine, a reporting function, etc. to collect data from documents (provided by the OUs to the Trading Grid for processing), analyze the collected data, and generate results that can be visualized for presentation, for instance, on client devices associated with the OUs.

Figure 6:
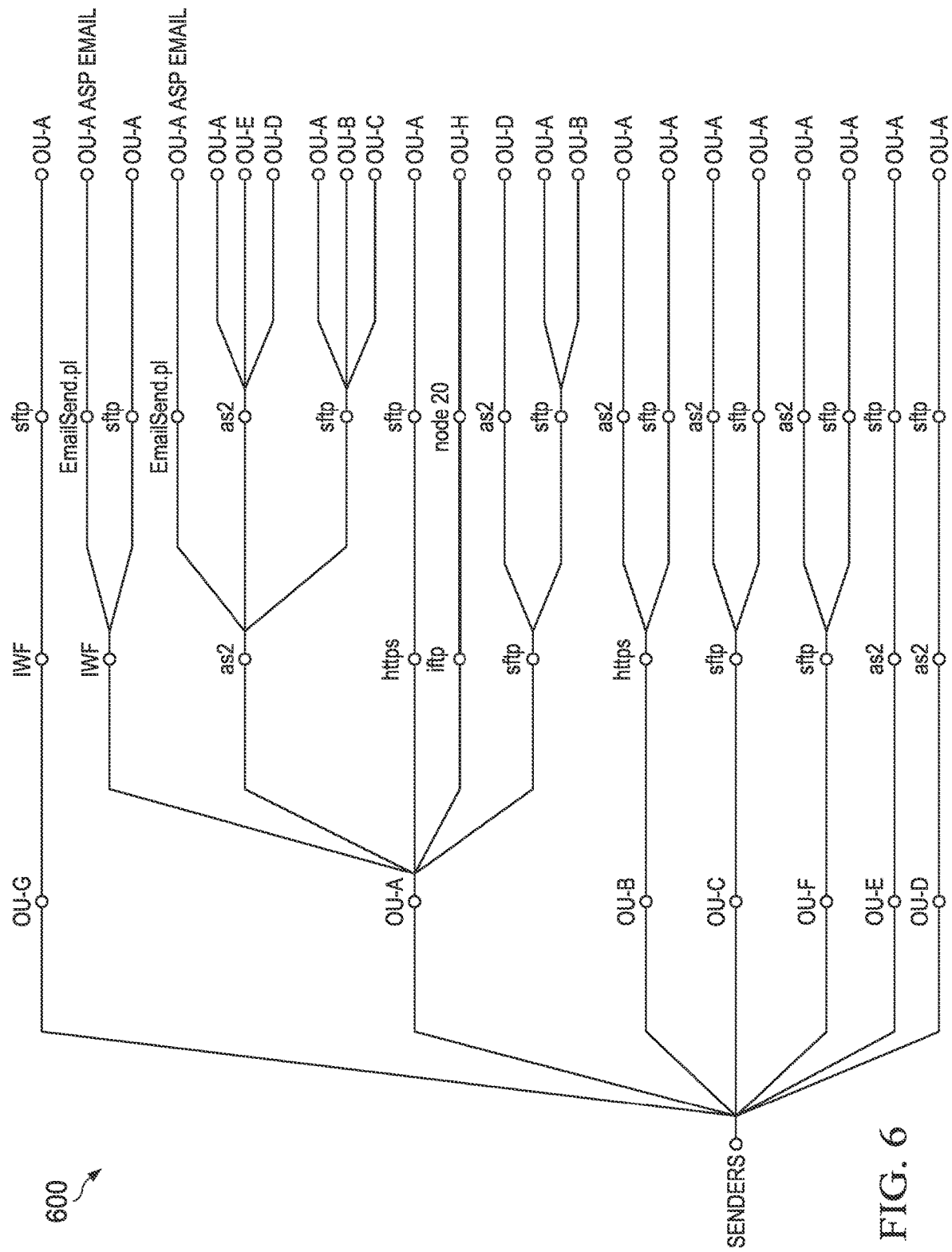
FIG. 6 depicts a diagrammatic representation of an example of a portion of a trading partner graph from the perspective of senders according to some embodiments.
Figure 7:
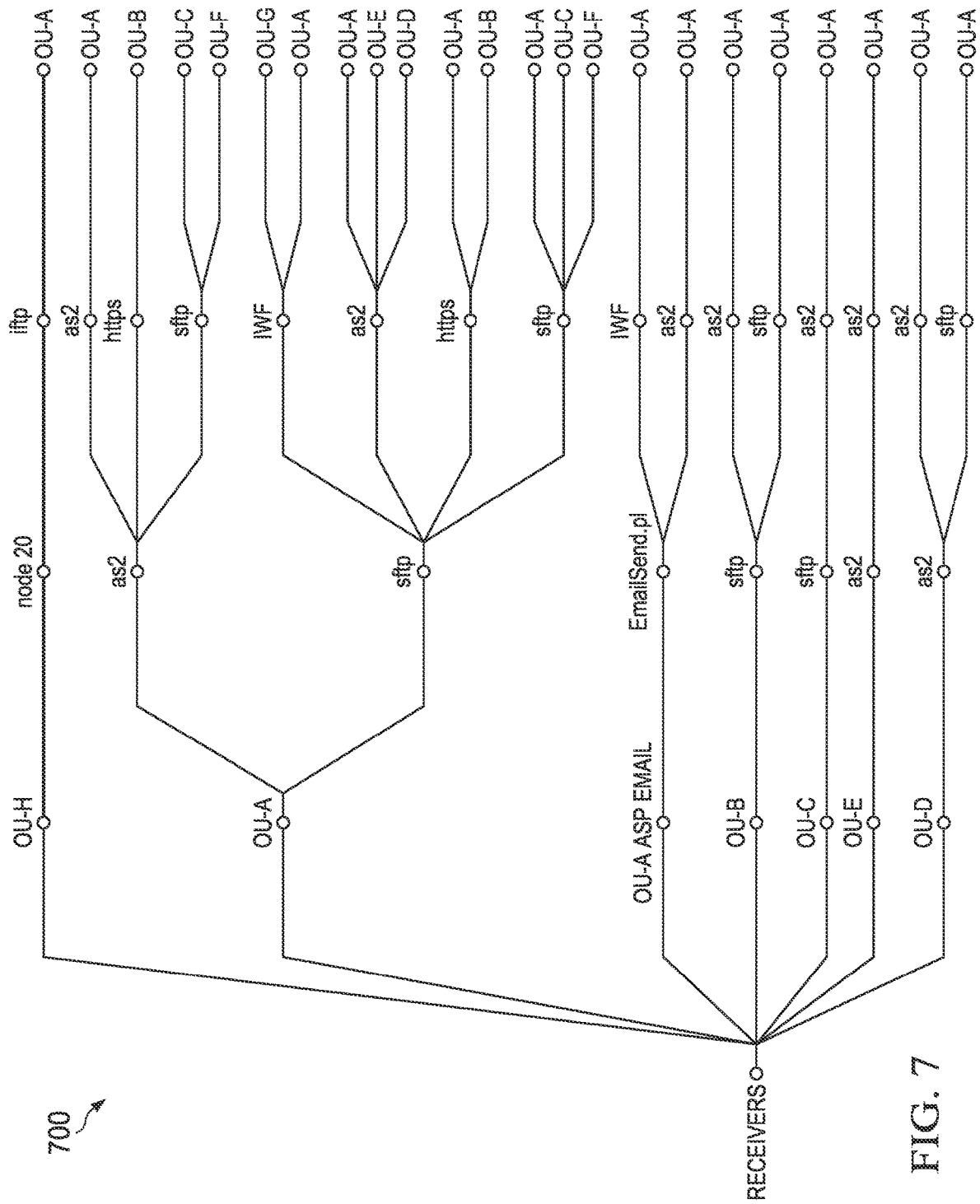
FIG. 7 depicts a diagrammatic representation of an example of a portion of a trading partner graph from the perspective of receivers according to some embodiments.

As illustrated in FIGS. 6 and 7, a TP Graph may be represented or otherwise visualized on a display device in many different ways to reflect these different relationships (and, correspondingly, different perspectives of relationships). Specifically, FIG. 6 depicts a diagrammatic representation of an example of a portion 600 of a TP Graph from the perspective of senders and FIG. 7 depicts a diagrammatic representation of an example of a portion 700 of the TP Graph from the perspective of receivers according to some embodiments. When a user associated with a particular OU logs into the Trading Grid, the Trading Grid operates to determine whether the user has (permission to) access the TP Graph based on the OU's relationships with their TPs established. The extent of the TP Graph that is viewable and that is presented to the user depends on these relationships (i.e., the portion of the TP Graph shown to the user of the OU reflects the OU's relationships with other OUs on the Trading Grid). Viewed as an OU, the TP Graph can be used by the Trading Grid to control user access based on the OU's relationship(s) with other OUs on the Trading Grid. This can be important in the supply chain network, for instance, in a shipping world as the Trading Grid can effectively and efficiently monitor and control who can view an order, invoice, payment, etc. associated with a shipment from one OU to another OU.

The system described above can provide a highly efficient solution for OUs to exchange information without the downside of leaking information outside of their respective, disconnected communities and yet can benefit from being part of the TG. For example, multiple exchanges may occur in the completion of work. Suppose an OU needs to build a long-range, wide-body twin-engine jet airplane. The OU would need to order a fuselage, engines, etc. and this may lead to interactions among many suppliers that are not visible to the OU (and, as such, they are not in the OU's community). In some embodiments, the system may track such interactions via the TG and may correspondingly generate a custom report for the OU. As illustrated in FIG. 8, in some embodiments, the system may implement a method 800 that includes analyzing a TP Graph and master data relative to the OU (801), determining or inferring indirect relationship(s) between the OU and potential TPs based on the tracked interactions (805), and updating the TP Graph to include or identify such relationships (810). Optionally, the system may generate a custom report on the identified relationships (815) and provide same to the OU (820). Because parts for the airplane (which exemplifies a complex work order) may be built on a per-unit basis, the OU may utilize such a relationship report to streamline and/or optimize their work order.

Such supply chain activities can drive downstream as well as upstream activities. For example, if demand for airplane parts slows down, the slowdown would have an aggregated effect on the TG. To this end, FIG. 9 illustrates an example of a method 900 of using a TP Graph to generate a global outlook or forecast. According to some embodiments, the system may aggregate trading activities and volume data across the entire TG (901), analyze the aggregated information (905) by, for instance, running analytics on the aggregated trading activities and volume data, and generate at least one forecast by applying results from the analytics to a predictive model (910). Optionally, the system may provide and/or display the forecast(s) as a service to registered OUs. Following the above example, the system may determine that the demand for airplane parts has slowed down in the past twelve months globally based on the aggregated trading activities and volume data across the TG and may determine, using a forecast model appropriate for the airplane parts manufacturing field, that the global demand for airplane parts likely will continue to fall in the next twelve months. This forecast can be valuable to a supplier in the airplane parts manufacturing field that would not otherwise have information about the trend in global demand.

FIG. 10 illustrates an exemplary architecture for network computing environment 1000 that includes network 1014 that can be bi-directionally coupled to OU computer 1012, TP computer 1015, and TG server computer 1016. TG server computer 1016 can be bi-directionally coupled to database 1018. Network 1014 may represent a combination of wired and wireless networks that network computing environment 1000 may utilize for various types of network communications known to those skilled in the art.

For the purpose of illustration, a single system is shown for each of OU computer 1012, TP computer 1015, and TG server computer 1016. However, within each of OU computer 1012, TP computer 1015, and TG server computer 1016, a plurality of computers (not shown) may be interconnected to each other over network 1014. For example, a plurality of OU computers 1012 and a plurality of TP computers 1015 of their TPs may be coupled to network 1014. OU computers 1012 may include data processing systems for communicating with TG server computers 1016. TG server computers 1016 may include data processing systems configured for providing services, community management, and/or façade management to OU computers 1012.

As a non-limiting example, OU computer 1012 can include central processing unit ("CPU") 1020, read-only memory ("ROM") 1022, random access memory ("RAM") 1024, hard drive ("HD") or storage memory 1026, and input/output device(s) ("I/O") 1028. I/O 1029 can include a keyboard, monitor, printer, electronic pointing device (e.g., mouse, trackball, stylus, etc.), or the like. OU computer 1012 can include a desktop computer, a laptop computer, a personal digital assistant, a cellular phone, or nearly any device capable of communicating over a network. TP computer 1015 may be similar to OU computer 1012 and can comprise CPU 1050, ROM 1052, RAM 1054, HD 1056, and I/O 1058.

Likewise, TG server computer 1016 may include CPU 1060, ROM 1062, RAM 1064, HD 1066, and I/O 1068. TG server computer 1016 may include one or more backend systems configured for providing a variety of services to OU computers 1012 over network 1014. One example of such a backend system can be a database management system for database 1018. Many other alternative configurations are possible and known to skilled artisans.

Each of the computers in FIG. 10 may have more than one CPU, ROM, RAM, HD, I/O, or other hardware components. For the sake of brevity, each computer is illustrated as having one of each of the hardware components, even if more than one is used. Each of computers 1012, 1015, and 1016 is an example of a data processing system. ROM 1022, 1052, and 1062; RAM 1024, 1054, and 1064; HD 1026, 1056, and 1066; and database 1018 can include media that can be read by CPU 1020, 1050, or 1060. Therefore, these types of memories include non-transitory computer-readable storage media. These memories may be internal or external to computers 1012, 1015, or 1016.

Portions of the methods described herein may be implemented in suitable software code that may reside within ROM 1022, 1052, or 1062; RAM 1024, 1054, or 1064; or HD 1026, 1056, or 1066. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:
   aggregating, by a computer operating on an information exchange platform, trading activities and volume data across the information exchange platform, wherein the trading activities and volume data relate to operating units that exchange information about a plurality of items through the information exchange platform;
   running, by the computer, analytics on the trading activities and volume data thus aggregated to thereby produce analytic results, wherein running the analytics comprises determining whether a global demand for the plurality of items or a portion thereof has been decreasing or increasing in a previous timeframe based on the trading activities and volume data within the previous timeframe thus aggregated across the information exchange platform in a trading partner (TP) graph and wherein the analytic results comprise the global demand;
   applying, by the computer, the analytic results to a predictive model configured for predicting a global trend for the plurality of items or the portion thereof in view of the trading activities and volume data across the information exchange platform, wherein the predictive model is operable to determine, based at least in part on the global demand, whether the global trend for the plurality of items or the portion thereof is to continue decreasing or increasing in a next timeframe; and
   providing, by the computer, the global trend for presentation on a client device.

2. The method according to claim 1, wherein the aggregating comprises updating a trading partner graph stored in a database utilizing the trading activities and volume data.

3. The method according to claim 2, wherein the trading partner graph represents the operating units, trading partners of the operating units, and relationships between the operating units and the trading partners.

4. The method according to claim 1, further comprising:
   determining, based on the trading activities and volume data thus aggregated, that a demand for an item has slowed down; and
   generating a report to indicate that the demand for the item has slowed down.

5. The method according to claim 1, further comprising:
   determining, based on the global trend, a future demand for one of the plurality of items.

6. The method according to claim 1, wherein the global trend comprises a global demand for the plurality of items or the portion thereof.

7. The method according to claim 1, wherein the plurality of items comprises a formatted message, content data, a document, or a combination thereof.

8. A system, comprising:
a processor;
a non-transitory computer-readable medium; and
instructions stored on the non-transitory computer-readable medium and translatable by the processor for:
aggregating trading activities and volume data across an information exchange platform, wherein the trading activities and volume data relate to operating units that exchange information about a plurality of items through the information exchange platform;
running analytics on the trading activities and volume data thus aggregated to thereby produce analytic results, wherein running the analytics comprises determining whether a global demand for the plurality of items or a portion thereof has been decreasing or increasing in a previous timeframe based on the trading activities and volume data within the previous timeframe thus aggregated across the information exchange platform in a trading partner (TP) graph and wherein the analytic results comprise the global demand;
applying the analytic results to a predictive model configured for predicting a global trend for the plurality of items or the portion thereof in view of the trading activities and volume data across the information exchange platform, wherein the predictive model is operable to determine, based at least in part on the global demand, whether the global trend for the plurality of items or the portion thereof is to continue decreasing or increasing in a next timeframe; and
providing the global trend for presentation on a client device.

9. The system of claim 8, wherein the aggregating comprises updating a trading partner graph stored in a database utilizing the trading activities and volume data.

10. The system of claim 9, wherein the trading partner graph represents the operating units, trading partners of the operating units, and relationships between the operating units and the trading partners.

11. The system of claim 8, wherein the instructions are further translatable by the processor for:
determining, based on the trading activities and volume data thus aggregated, that a demand for an item has slowed down; and
generating a report to indicate that the demand for the item has slowed down.

12. The system of claim 8, wherein the instructions are further translatable by the processor for:
determining, based on the global trend, a future demand for one of the plurality of items.

13. The system of claim 8, wherein the global trend comprises a global demand for the plurality of items or the portion thereof.

14. The system of claim 8, wherein the plurality of items comprises a formatted message, content data, a document, or a combination thereof.

15. A computer program product comprising a non-transitory computer-readable medium storing instructions translatable by a processor for:
aggregating trading activities and volume data across an information exchange platform, wherein the trading activities and volume data relate to operating units that exchange information about a plurality of items through the information exchange platform;
running analytics on the trading activities and volume data thus aggregated to thereby produce analytic results, wherein running the analytics comprises determining whether a global demand for the plurality of items or a portion thereof has been decreasing or increasing in a previous timeframe based on the trading activities and volume data within the previous timeframe thus aggregated across the information exchange platform in a trading partner (TP) graph and wherein the analytic results comprise the global demand;
applying the analytic results to a predictive model configured for predicting a global trend for the plurality of items or the portion thereof in view of the trading activities and volume data across the information exchange platform, wherein the predictive model is operable to determine, based at least in part on the global demand, whether the global trend for the plurality of items or the portion thereof is to continue decreasing or increasing in a next timeframe; and
providing the global trend for presentation on a client device.

16. The computer program product of claim 15, wherein the aggregating comprises updating a trading partner graph stored in a database utilizing the trading activities and volume data.

17. The computer program product of claim 16, wherein the trading partner graph represents the operating units, trading partners of the operating units, and relationships between the operating units and the trading partners.

18. The computer program product of claim 15, wherein the instructions are further translatable by the processor for:
determining, based on the trading activities and volume data thus aggregated, that a demand for an item has slowed down; and
generating a report to indicate that the demand for the item has slowed down.

19. The computer program product of claim 15, wherein the global trend comprises a global demand for the plurality of items or the portion thereof.

20. The computer program product of claim 15, wherein the plurality of items comprises a formatted message, content data, a document, or a combination thereof.

* * * * *